United States Patent [19]

McClure

[11] 4,065,642

[45] Dec. 27, 1977

[54] MESSAGE SIGNALING AND ALERTING SYSTEM AND METHOD THEREOF

[76] Inventor: William C. McClure, 1906 S. Nome St., Denver, Colo. 80232

[21] Appl. No.: 571,435

[22] Filed: Apr. 24, 1975

[51] Int. Cl.² ............................................. H04M 3/42
[52] U.S. Cl. ................................. 179/18 B; 179/6 R
[58] Field of Search ...................... 179/6 R, 6 C, 18 B, 179/18 BE, 6 E

[56] References Cited

U.S. PATENT DOCUMENTS

3,133,992  5/1964  Dickman .............................. 179/6 E

Primary Examiner—William C. Cooper
Attorney, Agent, or Firm—Burton & Dorr

[57] ABSTRACT

A telephone signaling and paging system is disclosed. The signaling and paging system senses the presence of a telephone message when recorded by a telephone answering system and automatically dials a preselected number to provide an alerting signal or page. Upon receipt of the alerting signal or page, the recipient, by dialing the answering unit number, can receive the recorded message and hence can be quickly alerted to the contents of the recorded message. The system includes a provision for repeated dialing of the preselected number by the system until contact is made to assure prompt message alerting, and also includes a provision for precluding signaling or paging should no message be recorded by the telephone answering unit. In addition, the system includes means whereby the alerting signal or page may be manually activated for alerting or paging purposes. The system can also be programmed to dial any number of digits and a capability is provided whereby each of a plurality of systems can be individually identified when received at a common preselected number.

62 Claims, 7 Drawing Figures

Fig_1

Fig_2

Fig. 3a

Fig_3b

Fig_4a

Fig_4b

Fig_5

MESSAGE SIGNALING AND ALERTING SYSTEM AND METHOD THEREOF

FIELD OF THE INVENTION

This invention relates to a telephone signaling and paging system and, more particularly, relates to an automatic system for sensing and signaling the presence of a message recorded by an answering unit.

BACKGROUND OF THE INVENTION

Telephone and paging systems have greatly increased both the speed and ease of communication in many instances. However, when the prospective recipient of a telephone call does not answer, this speed and/or ease of communication can be lost, even though the prospective recipient has provided an answering service to receive messages in his absence.

Electronic answering systems or circuits as now known or suggested, while having the capability to record messages, still depend upon the prospective recipient taking the initiative to determine the existence and contents of the recorded message. Obviously, valuable, and, perhaps, vital time can be lost between the recording of the message and receipt of the same by the desired recipient. In fact, vital hours, or even days, have heretofore been known to be lost between message recording and message receipt by the intended party.

It is, therefore, desirable to provide a device that can automatically alert a prospective recipient of a telephone call to the fact that the call has been received and make it possible to quickly learn the details of such a call. Obviously, such a device can speed telephone and paging communication, as well as ease establishment of such communication.

SUMMARY OF THE INVENTION

This invention provides a telephone signaling and paging system that senses recepit of a telephone call recorded at an automatic answering circuit and automatically signals the presence of the same whereby a prospective recipient can be quickly alerted to the presence of the call and thereafter be quickly advised of the recorded message.

It is, therefore, an object of this invention to provide an automatic telephone signaling and paging system.

It is another object of this invention to provide a telephone signaling and paging system that automatically alerts a prospective recipient to a received call.

It is yet another object of this invention to provide a telephone signaling and paging system that senses the receipt of a message by an answering circuit and automatically signals the presence of such a message.

It is still another object of this invention to provide a telephone signaling and paging system that automatically dials a preselected number in response to a message recorded at an answering circuit.

It is yet another object of this invention to provide a telephone signaling and paging system that repeatedly signals the presence of a recorded telephone call until receipt is acknowledged as well as continues to signal the presence of a recorded telephone call should he line being dialed return a busy signal.

It is yet another object of this invention to provide a telephone signaling and paging system that precludes an indication of a telephone message unless a message is recorded at an answering circuit.

It is still another object of this invention to provide a telephone signaling and paging system that can be manually actuated to provide an alerting signal or page.

It is still another object of this invention to provide a unit wherein each of a plurality of signaling and paging systems can be individually identified when received at a common preselected number.

It is yet another object of this invention to provide a telephone signaling and paging system that can be programmed to dial any number of digits such as between eight.

It is still another object of this invention to provide a system for automatically answering a telephone call, recording a message and alerting the prospective recipient to the presence of such a message.

It is yet another object of this invention to provide a system that automatically receives a telephone call, records a message, alerts the prospective recipient to the presence of such a message, and plays back recorded message to the prospective recipient upon demand.

With these and other objects in view, which will become apparent to one skilled in the art as the description proceeds, this invention resides in the novel construction, combination and arrangement of parts substantially as hereinafter described, and more particularly defined by the appended claims, it being expressly understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
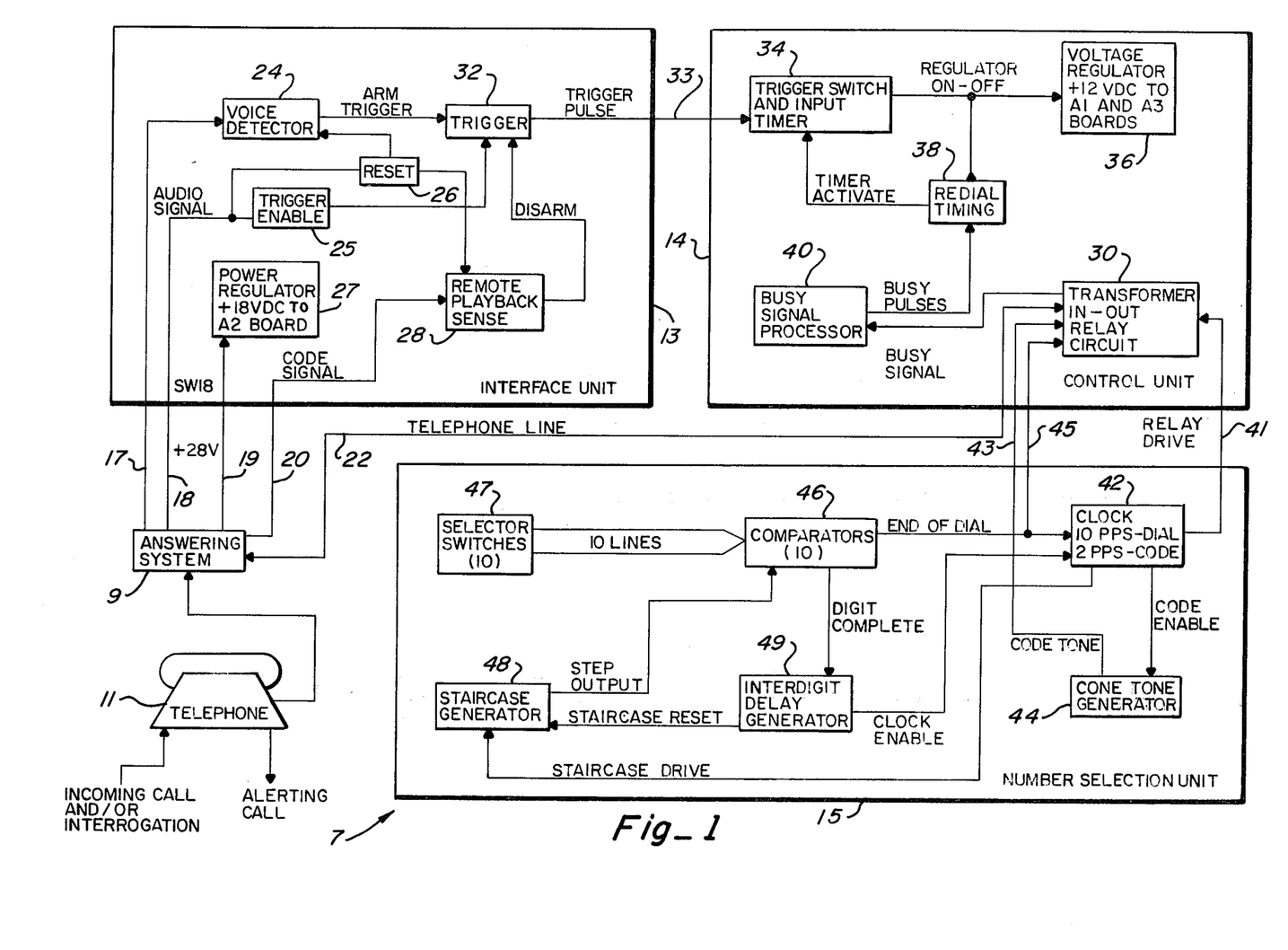
FIG. 1 is a block diagram of a telephone system that illustrates the preferred telephone signaling and paging embodiment of this invention.

Referring now to the drawings, the numeral 7 indicates generally the telephone signaling and paging system of this invention shown in block form in FIG. 1 and connected with an answering system, or unit, 9, which, in turn, is connected with telephone 11.

As indicated in FIG. 1, the telephone 11 receives the incoming call and/or an interrogation call where the message is to be played back to a recipient upon demand. In addition, telephone 11 may also provides the telephone link for the alerting call to the prospective recipient.

As indicated in FIG. 1, telephone signaling and paging system 7 includes an interface unit 13, a control untill 14, and a number selection unit 15. Basically, when a call is received by telephone 11, a conventional answering system 9 informs the caller by recorded message that the caller may leave a message. If the caller elects, a message may be recorded by the answering system 9 in conventional fashion.

Answering system 9 may be, for example, an automatic telephone answering device such as the Code-A-Phone Model 444 or Model 560, manufactured by Ford Industries, Inc., of Portland, Oregon. U.S. Pat. No. 3,562,430, owned by Ford Industries, Inc., describes in greater detail the aforesaid telephone answering device.

As shown in FIG. 1, answering system 9 is connected with interface unit 13 through leads 17, 18, 19 and 20, and through telephone line 22 to control unit 14. Lead 17 from the answering system (carrying an audio signal) is connected with voice detector 24 in interface unit 13, lead 18 (SW 18) is connected with trigger enable 25 and reset 26, lead 19 (+28v.) is connected with voltage regulator 27 which supplies +18v. DC power to the interface unit, and lead 20 (carrying the code signal) is connected with remote playback sense 28. Telephone line 22 is connected with transformer in-out relay circuit 30 in control unit 14.

Voice detector 24 is connected with trigger 32 the output of which is a trigger pulse coupled through lead 33 to trigger switch and input timer 34 of control unit 14. The output of trigger enable 25 is coupled to trigger 32, while one output from reset 26 is coupled to voice detector 24 and another is coupled to remote playback sense 28. The output from remote playback sense 28 is coupled to trigger 32 as a disarm input thereto.

In control unit 14, the output from trigger switch and input timer 34 is coupled to voltage regulator 36 as a regulator on-off signal and provides +12v. DC to the control unit 14 and the number selection unit 15. Radial timing 38 is connected with the lead carrying the regulator on-off signal and provides a timer activate signal to trigger switch and input timer 34.

Transformer in-out relay circuit 30 in control unit 14 supplies a busy signal input to busy signal processor 40, which, in turn, supplies busy pulses to redial timing 38. In addition, transformer in-out relay circuit 30 receives a relay drive input on lead 41 from clock 42 in number selection unit 15, a code tone input on lead 43 from code tone generator 44 in number selection unit 15, an end of dial input on lead 45 from comparators 46 in number selection unit 15.

In number selection unit 15, comparators 46 are connected with selector switches 47, with comparators 46 providing an end of dial signal to clock 42 and transformer in-out relay circuit 30. Clock 42 provides a code enable signal to code tone generator 44, and a staircase drive signal to staircase generator 48. Staircase generator 48 provides a step output to comparators 46, and a digit complete signal is supplied from comparators 46 to interdigit delay generator 49. Interdigit delay generator 49 supplies a clock enable signal to clock 43, and a staircase reset signal to stairway generator 48.

In operation, when a call is received at telephone link 11, the electronic answering system automatically answers the call and delivers a recorded message to the caller in conventional fashion. If the caller elects, a message will be recorded at the answering device, again in conventional fashion. As soon as the message from the caller is recorded, the presence of the message is sensed at voice detector 24, and this triggers the signal and paging system into action by activation of voltage regulator 36 thereby supplying +12v. DC to the control unit 14 and the number selection unit 15 (the interface unit is supplied +18v. DC by voltage regulator 27).

Figure 5:
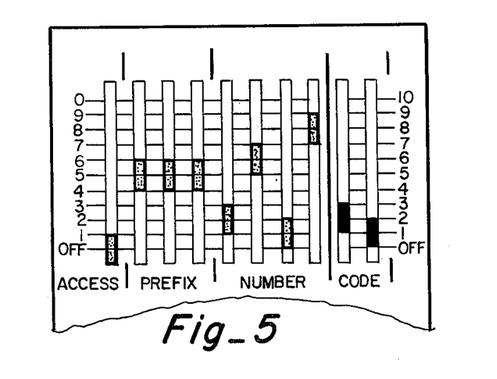
FIG. 5 is a partial view of the preferred telephone signaling and paging system of this invention showing a typical setting of the selection switches used to preselect a telephone number to be automatically dialed in accordance with this invention.

The signaling and paging system of this invention preferably operates either to dial a preselected page number or dialing any preselected telephone number which identifies the intended recipient. As indicated in FIG. 5, the telephone number dialed is preselectable and a predetermined number of digit selectability is provided. Thus, for example, if a local telephone number, identifying the called telephone of which the intended recipient is located, is to be dialed, seven digits are utilized, while for internal numbers, for example, four digits may be utilized to ring a desired internal system number. Eight digits might be utilized for example, for a long distance number with the same area code (where a prefix 1 must be utilized) or for obtaining an outside line (where the prefix 9 is commonly utilized). In FIG. 5, the seven digit number selected by selector switches 47 by way of example is 555-2618. The remaining two switches of selector switches 47 select the code as also indicated in FIG. 5 (shown as code 2 and 1). The operation of interface unit 13, control unit 14, and number selection unit 15 is disclosed more fully hereinafter.

When the called telephone is answered by lifting the telephone receiver, a tone is heard (selected by the code switches of selection switches 47), and this alerts the recipient that a telephone message has been recorded on the telephone answering system. Since the code is selectable, a predetermined different tone can be utilized for each answering system if a plurality of systems are to be connected to a common telephone to be dialed. This enables the recipient to distinguish and, thus, determine which answering system has a message recorded.

Should the telephone caller fail to leave a message, then the system does not dial the preselected number, and to prevent false indications of received messages, it has been found preferable to preclude dialing of the preselected number unless a message of at least five seconds is recorded at the answering system.

If the dialed number is busy, redial timing 38 and busy signal processor 40 will cause the number to be repeatedly redialed until the call is completed. In addition, if a call is not answered, the call will be automatically discontinued by the system after one minute so that the line is not indefinitely tied up.

As an added feature, manual alerting at the switching system by depressing a manual actuation switch (not shown) is made possible and, thus, causes the preselected number to be dialed just as if a recorded message had been received at the automatic answering system.

After being alerted, the recipient may dial the number of telephone 11, and with a conventional coding device can cause the message recorded by the answering system 9 to be played back so that the recipient can quickly learn the contents of the recorded message. Coding devices of this type are conventional, and one such device, known as a pocket coder, is offered commercially by Ford Industries, Inc., of Portland, Oregon, in conjunction with their commercially available answering device, examples of which are set forth hereinbefore.

Figure 2:
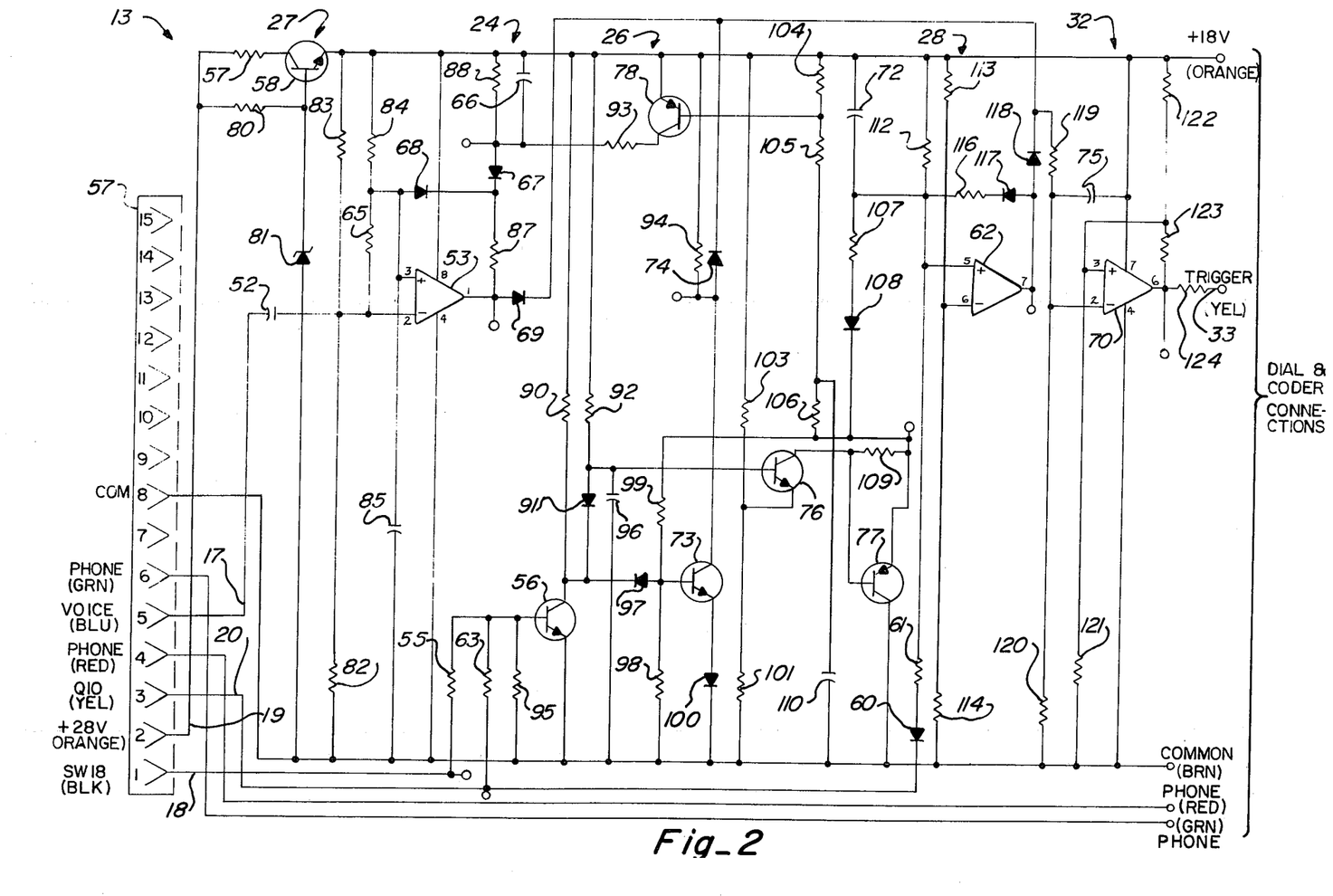
FIG. 2 is a schematic diagram of the interface unit shown in block form in FIG. 1.

Referring to FIG. 2, a schematic diagram of interface circuit 13 is shown. Connector 51 is used to connect unit 13 with answering system 9. The voice input (pin 5) is coupled through lead 17 and capacitor 52 to operational amplifier 53, the SW 18 input (pin 1) is coupled through lead 18 and resistor 55 to transistor 56, a +28v. input (pin 2) is coupled through lead 19 and resistor 57 to transistor 58, and the code signal input (pin 3) is coupled through lead 20, diode 60 and resistor 61 to operational amplifier 62 and through resistor 63 to transistor 56.

The incoming audio signal from the telephone answering system 9 is coupled to the inverting input (pin 2) of operational amplifier 53 through capacitor 52, with audio sensitivity being determined by the value of resistor 65. If the audio on pin 2 is of sufficient potential, the output (on pin 1) will begin to charge capacitor 66 having an initial potential of approximately 12 volts. When the charge level of capacitor 66 reaches the same potential as pin 2 of operational amplifier 53, it latches the operational amplifier low through the path of diode 67 and 68 to pin 3 of operational amplifier 53. With operational amplifier 53 latched low, capacitor 66 will remain charged. Also, diode 69 will be reversed biased, which is on of the three requirements for an output to be coupled from pin 6 of operational amplifier 70. If a low is felt on pin 3 of connector 51, capacitor 72 will be unable to charge, making the potential of pin 5 below pin 6 of operational amplifier 62, latching operational amplifier 62 low. Operational amplifier 62 low at pin 7 is the second requirement for an output on pin 6 of operational amplifier 70. The third low condition required for an output on pin 6 is that the collector of transistor 73 be drawn low, reverse biasing diode 74, thus allowing capacitor 75 to charge, which, in turn, gives a trigger output on pin 6 of operational amplifier 70.

The circuitry composed of transistors 56, 76, 77 and 78 is the reset circuit 26. Prior to an incoming call, transistor 56 is turned off, allowing transistors 76 and 77 to be turned on. With an incoming call, transistor 56 is turned on, thus turning off transistors 76 and 77. When transistor 77 is turned on after the telephone call has been completed, the negative side of capacitor 66 goes positive, thereby resetting the previously latched operational amplifier 53, and allowing the system to take another telephone call.

An illustrative listing of components for interface circuit 13 follows. It is to be realized, however, that the particular components listed are for illustrative purposes only, and the invention is not meant to be limited thereto. Components for the interface circuit:

Resistors (ohms): 55-100k; 57-100; 61-100k; 63-100k; 65-47k; 75-10; 80-2.2k; 82-22k; 83-10k; 84-470k; 87-100k; 88-1M; 90-100k; 92-2.2M; 93-1k; 94-100k; 95-10k; 98-100k; 99-1M; 101-10k; 103-22k; 104-10k; 105-100k; 106-1k; 107-1k; 109-10k; 112-1M; 113-47k; 114-100k; 116-10k; 119-47k; 120-470k; 121-220k; 122-220k; 123-220k; and 124-100.

Capacitors (mfd): 52-0.1; 66-10; 72-10; 85-0.1; 96-10; and 110-10.

Operational Amplifiers: 53 and 62 – 1061 (dual 741); and 70-1060 (single 741).

Transistors: 56, 58, 73 and 76 - GE 4936; and 77 and 78 - GE1691.

Diodes: 60, 67, 68, 69, 74, 91, 97, 100, 108, 117 and 118 - 1N4454.

SCR: 81-18v.

Referring now to control unit 14 and number selection unit 15, the microphone 130, microphone amplifier 131 and connections 132 to a battery power supply need not be used. The incoming trigger signal on lead 33 turns on SCR 134, which supplies the voltage to transistor 135 and junction 136. With operational amplifier 138 being supplied by power through junction 136, operational amplifier 138 comes up in the high condition, turning on transistors 135, 139 and 140. Transistor 140 supplies the regulated 12 volts to the control unit 14 and the number selection unit 15. The regulated 12 volts turns on transistor 142, seizing the telephone line.

Figure 4A:
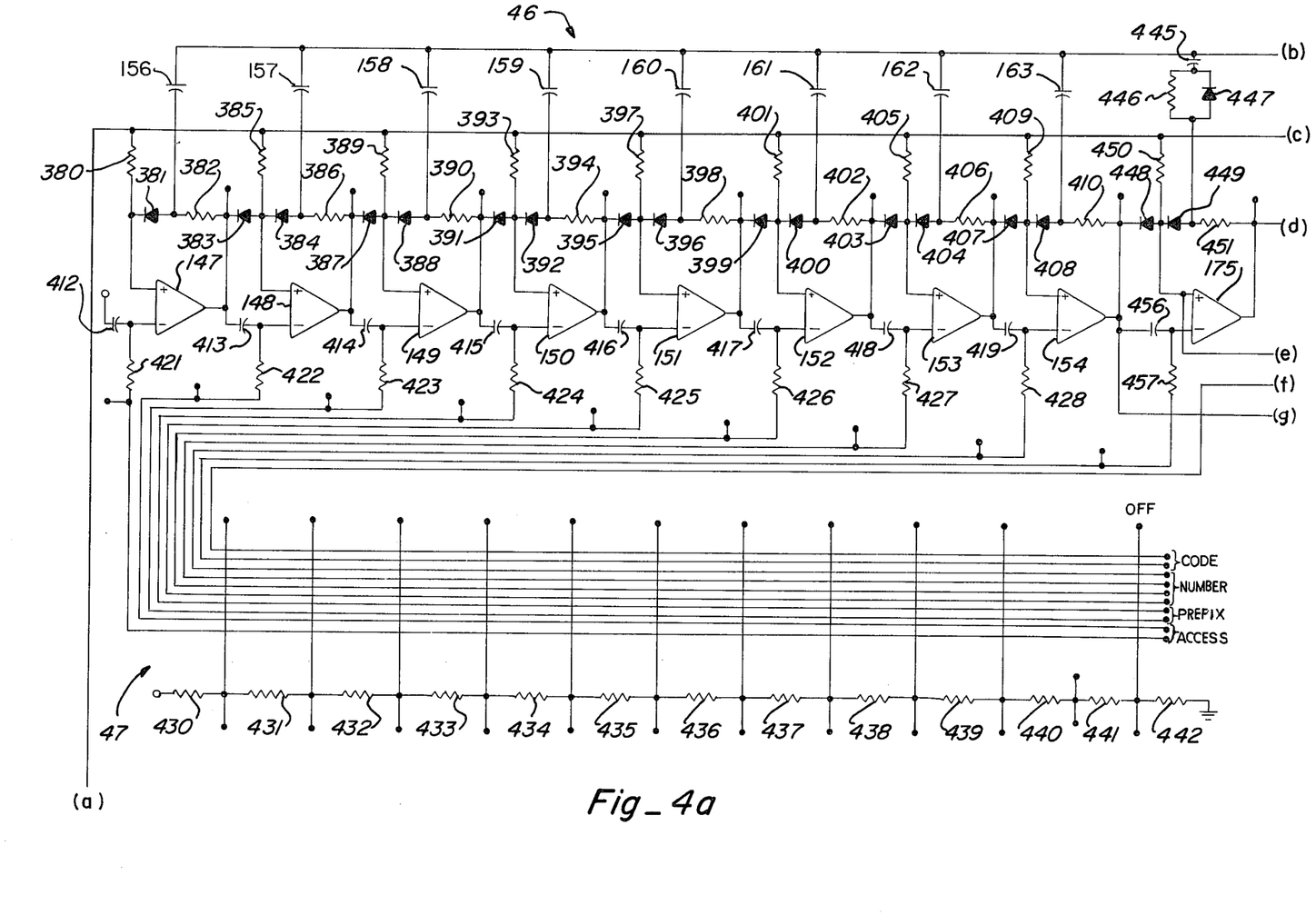
FIGS. 4a and 4b taken together are a schematic diagram of the number selection unit shown in block form in FIG. 1.
Figure 4B:
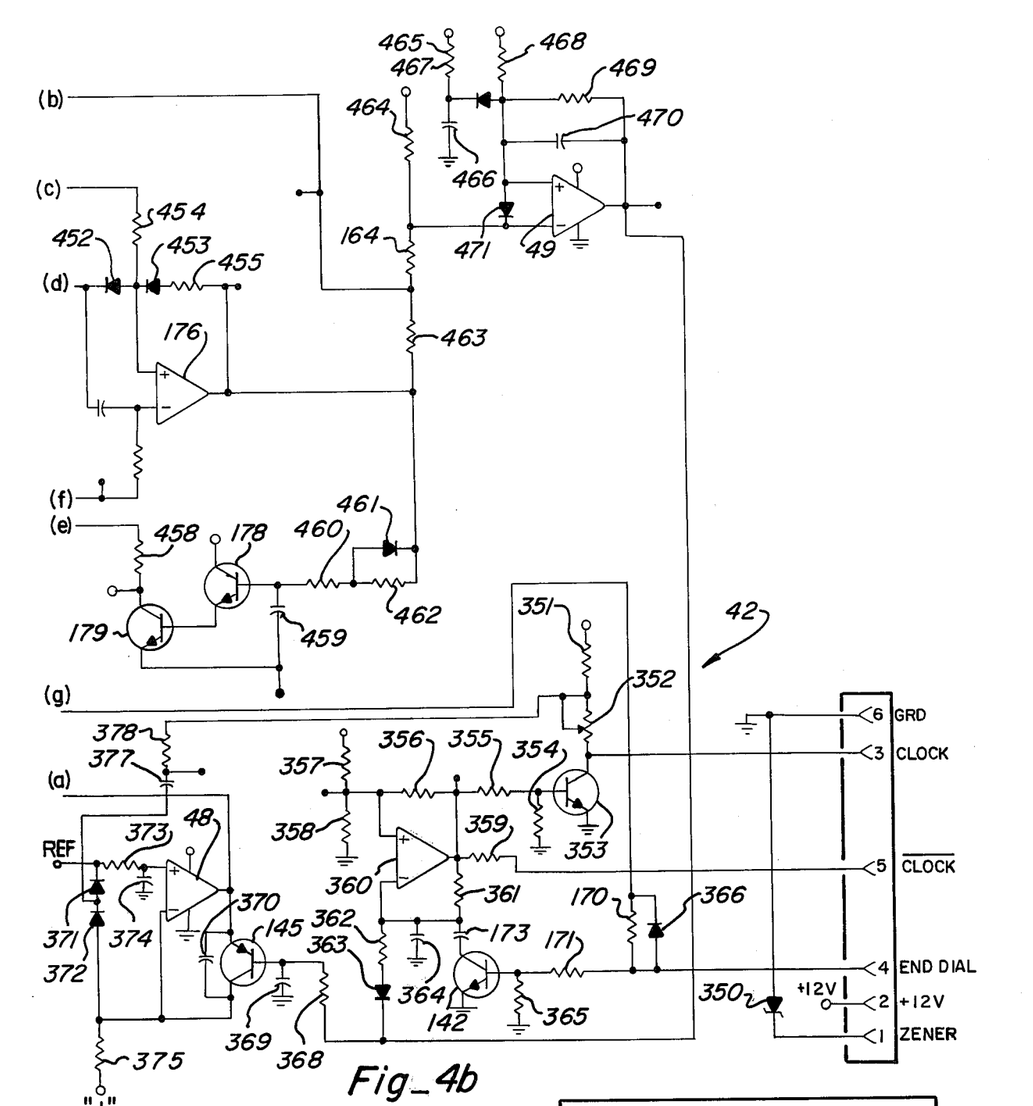

The inner digit delay generator 49 in number selection unit 15 goes high after approximately five seconds delay to allow time for the system to receive the dial tone. When generator 49 goes high, transistor 145 turns off, which allows the staircase generator 48 to build to the potential of the digit being dialed. When the output of generator 48 is equal to the output of the digit being dialed, the operational amplifiers (147-154) are latched low, allowing the next digit to come up.

The pulse from each digit is also coupled back through capacitors 156-163 and resistor 164 to the inner digit delay generator 49, allowing a pause between each digit dialed. Oscillator 44 of control unit 14 (which could be in number selection unit 15 as indicated in the block diagram of FIG. 1) supplies the clock pulses to the staircase generator 48, which steps up to each digit. When the generator 49 output goes low, transistor 145 turns on which discharges the staircase generator 48 back to zero. This sequence is repeated with each digit dialed. With each clock cycle, a dialing relay is pulsed with the clock line. Also, with generator 49 going low after each digit, it stops the clock line. With the last digit dialed, a high level is felt out of operational amplifier 154, giving an end of dial signal. This signal is coupled through lead 45 and holds the dialing relay 168 latched. In the number selection unit 15, end of dial through resistors 170 and 171 turns on transistor 172, which adds capacitor 173 to the clock circuit. This starts generation of the code tones. The code tones are generated slower, due to the frequency change in the clock. The staircase generator steps up to the value set in the code tone. The tone pulses are generated through operational amplifiers 49, 175 and 176. The circuit of transistors 178 and 179 makes up a repeater circuit. This allows the tones to be continuously repeated on a telephone call. The code oscillator 44 is pulsed by the clock line. With a completed call, end of dialing also goes into operational amplifier 180, which is initially set with its output high. The high output will turn on transistors 181 and 182, thus disabling the telephone input 130 (unused), and allows capacitor 184 to charge. When capacitor 185 charges to a sufficient level, the output of operational amplifier 180 will go low, turning off transistor 183, allowing capacitor 184 to discharge through resistor 186. This RC charge time is the fifty second time before disconnect, after dialing. When capacitor 184 is charged, it will fire PUT 187. This in turn sends a negative spike through capacitor 184, removing the holding current from SCR 134, turning the system off.

Figure 3A:
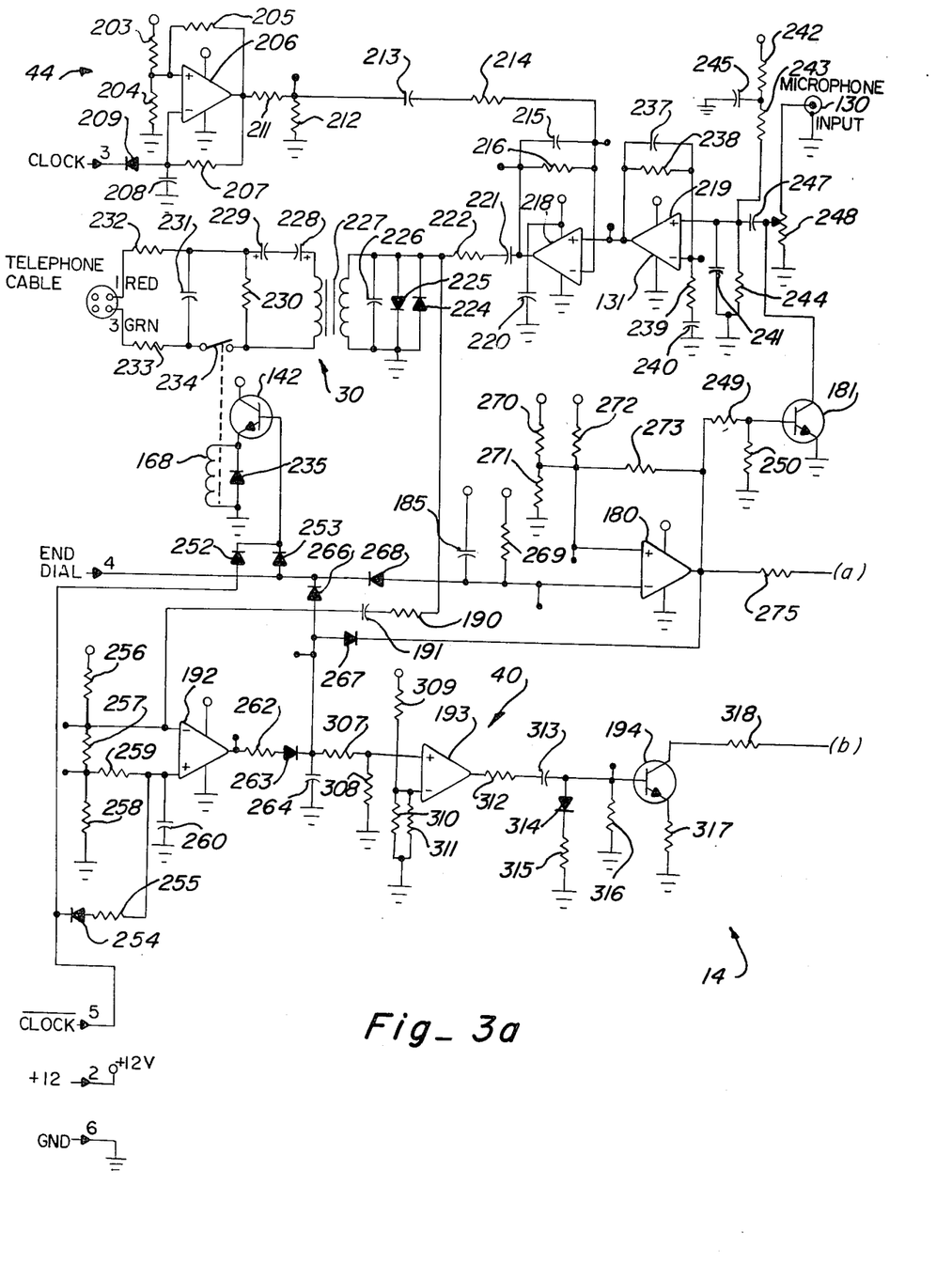
FIGS. 3a and 3b taken together are a schematic diagram of the control unit shown in block form in FIG. 1.
Figure 3B:
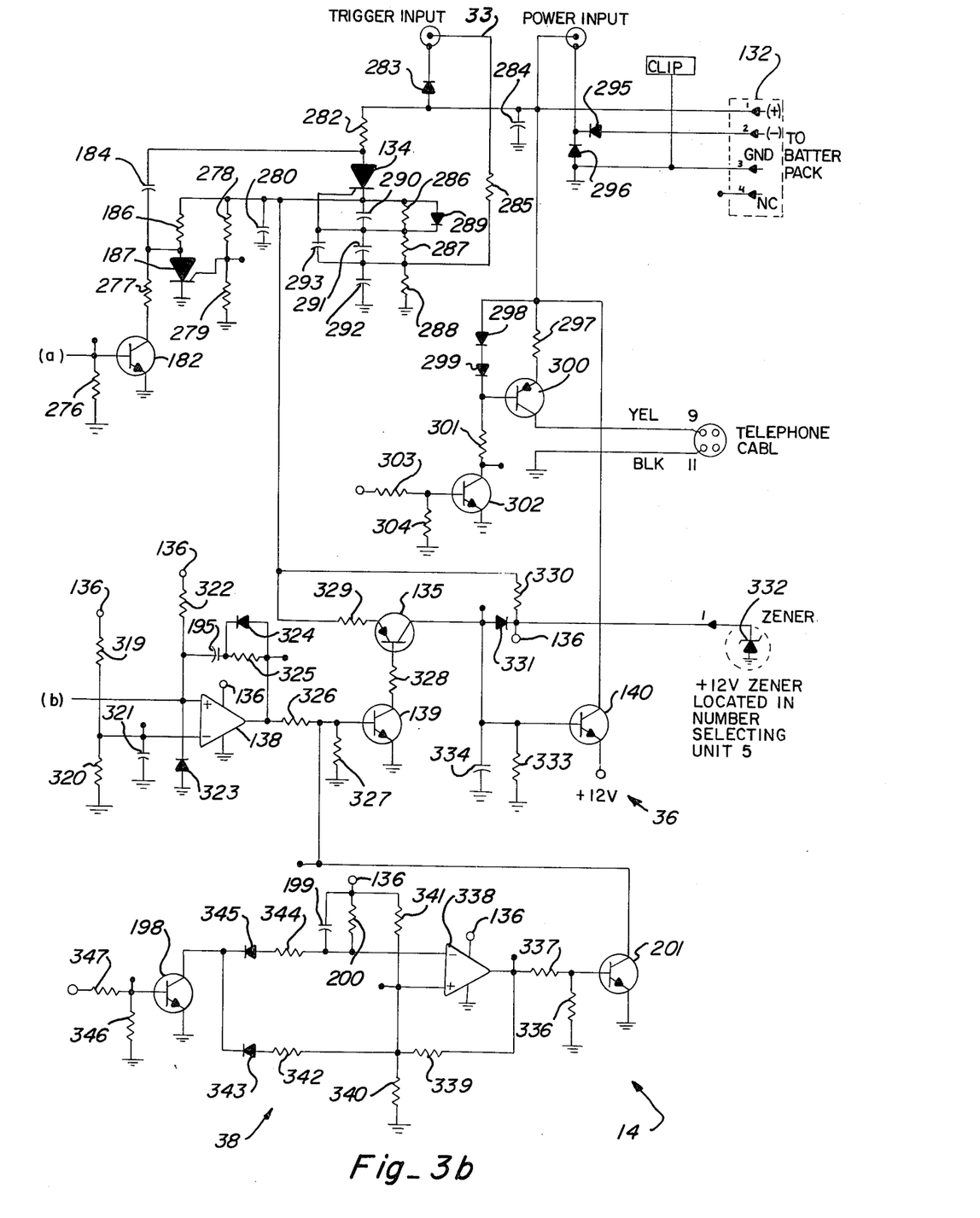

If the call cannot be completed, due to a busy signal, it activates the busy signal redial circuit. The busy signal is coupled through resistor 190 and capacitor 191 to pin 2 of operational amplifier 192. The output of operational amplifier 193 turns on transistor 194, which discharges capacitor 195. Capacitor 195 will stairstep down with each busy signal, until pin 3 of operational amplifier 197 goes below pin 2, turning operational amplifier 197 off. This will turn off transistors 135, 139 and 140, which turns the 12 volt supply off. With the 12 volts off, transistor 198 turns off. This allows capacitor 199 to charge through the resistor 200. This charge time is set for seven seconds. During this time, transistor 201 is turned on. When pin 7 of operational amplifier 193 goes low, transistor 201 turns off and redialing power is supplied to the system, allowing it to redial the preset number. This redialing sequence will continue until the call has been completed.

An illustrative listing of components for control unit 14 and number selection unit 15 follows. It is to be realized, however, that the particular components listed are for illustrative purposes only, and the invention is not meant to be limited thereto. Components for the control circuit unit 14 are:

Resistors (ohms):
186-2.2M; 190-2.2k; 200-470k; 203-220k; 204-220k; 205-22k; 207-22k; 211-10k; 212-47; 214-2.2k; 216-220k; 222-470; 230-220; 232-47; 233-47; 238-220k; 239-2.2k; 242-22k; 243-220k; 244-220k; 245-10; 248-250k; 249-220K; 250-47k; 255-100k; 256-100k; 257-220; 258-100k; 259-47k; 262-22k; 269-1M; 270-2.2M; 271-1M; 272-470k; 273-2.2M; 275-220k; 276-47k; 277-47k; 278-220k; 279-1M; 282-220; 285-220; 286-2.2k; 287-1M; 288-100k; 297-10; 301-4.7k; 303-100k; 304-10k; 307-100k; 308-470k; 309-1M; 310-1M; 311-470k; 312-4.7k; 315-10k; 316-100k; 317-10k; 318-100k; 319-1M; 320-470k; 322-1M; 325-100k; 326-100k; 327-22k; 328-100k; 329-220; 330-2.2k; 333-100k; 336-47k; 337-220k; 339-1M; 340-1M; 341-220k; 342-100k; 344-220k; 346-4.7k and 347-220k.

Capacitors (mfd):
184-10; 185-10; 191-0.1; 195-10; 199-10; 208-0.01; 213-0.1; 215-330 pfd; 220-0.01; 221-10; 226-0.01; 228-4.7; 229-4.7; 231-0.1; 237-330 pfd; 240-0.1; 241-0.01; 247-0.1; 260-0.1; 264-0.47; 280-0.47; 284-47; 290-0.1; 291-0.01; 292-0.1; 293-0.01; 313-10; 321-0.1; and 334-0.1.

Operational Amplifiers:
131, 138, 192, 197, 218, 219 and 338 – 1061 (Dual 741); and 180 and 206-1060 (Single 741).

Transistors:
135-GE 1691; 139, 140, 142, 172, 181, 182, 194, 198, 201 and 302-GE 4936; and 300-MJE 2370.

Diodes:
209, 224, 225, 235, 253, 54, 263, 266, 267, 268, 283, 289, 295, 296, 298, 299, 314, 323, 331, 343 and 345-1N4454; 252 and 324-1N34; and 332-Zener 12v.

SCR:
134-RTJ 0520 and PUT 187 – MPU132 Relay - 168; Transformer 227; and Switch - 234. Components for the number selection unit 15 are:

Resistors (ohms):
164-10k; 170-10k; 171-100k; 351-12k; 352-2k; 354-100k; 355-470k; 356-150k; 357-390k; 358-220k; 359-22k; 361-470k; 362-47k; 365-10k; 368-100k; 373-22k; 375-4.7M; 378-22k; 380-220k; 382-22k; 385-220k; 386-22k; 389-220k; 390-22k; 393-220k; 394-22k; 397-220k; 398-22k; 401-220k; 402-22k; 405-220k; 406-22k; 409-220k; 410-22k; 421 to 428-220k; 430-2.7k; 431 to 439-470; 440-220; 441-220; 442-2.7k; 446-1M; 450-220k; 451-22k; 454-220k; 455-22k; 457-220k; 458-220; 460-100k; 462-2.2M; 463-220k; 464-100k; 465-470k; 468-2.2M; and 469-10M.

Capacitors (mfd):
156 to 163-0.01; 173-0.1; 364-0.1; 369-0.1; 370-47(x4); 374-10; 377-0.1; 412 to 419-0.1; 445-0.01; 456-0.1; 459-10; 466-10; and 470-47.

Operational Amplifiers:
48, 49, 147 to 154, 175, 176 and 360 - Delta P/N-1060.

Transistors:
145-Delta P/N B-1098; and 178, 179 and 353-Delta P/N B-1097.

Diodes:
350-Zener 12v.; and 363; 366; 371; 372; 381; 383; 384; 387; 388; 391; 392; 395; 396; 399; 400; 403; 404; 407; 408; 447; 448; 449; 452; 453; 461; 467 and 471 - 1N4454.

In view of the foregoing, it is to be realized that this invention provides a heretofore unknown telephone signaling and paging system that senses a message recorded on an answering device and automatically dials a preselected number for signaling and paging purposes. Although the present invention has been described with a certain degree of particularity, it is to be understood that the present disclosurw has been made by way of example and that changes in structure other than those previously described may be made without departing from the spirit thereof.

What is claimed is:

1. A telephone signaling system for use with an electronic answering unit that is connectable with a telephone so that when connected a caller can record a message for later playback by an intended recipient, said system comprising:

sensing means connected with said electronic answering unit for sensing recording of a message by said unit and providing an output indicative thereof; and alerting means connected with said sensing means and upon receipt of said output therefrom providing a predetermined signal to be sent to a preselected device whereby an intended recipient can be quickly alerted that a message has been recorded by said answering unit.

2. The telephone signaling system of claim 1 wherein said sensing means includes a voice detector and a trigger circuit, said trigger circuit providing said output indicative of the sensed recording of a message.

3. Telephone signaling system of claim 1 wherein said alerting means includes number selection means whereby a preselected number is automatically dialed upon receipt of an output from said sensing means.

4. The telephone signaling system of claim 3 wherein said preselected number is a conventional telephone number.

5. The telephone signaling system of claim 3 wherein said preselected number is a paging number.

6. A telephone signaling system for use with an answering unit that is interconnectable with a telephone so that a caller can record a message on said answering unit for later playback by an intended recipient, said system comprising:

means operative with said answering unit for sensing the recording of a message by said unit and for providing an output indicative thereof;

means operative upon receipt of said output therefrom for automatically establishing a communication path to said intended recipient; and means responsive to the establishment of said path for providing a signal to said intended recipient, said signal providing an alert to said recipient that a message has been recorded by said answering unit.

7. The telephone signaling system of claim 6 wherein said establishing means includes means for repeatedly attempting to establish said path to said intended recipient, said repetition continuing until said path is established.

8. The telephone signaling system of claim 6 wherein said system further includes means for uniquely identifying itself from a plurality of other systems also providing signals to said recipient.

9. The telephone signaling system of claim 6 wherein said sensing means will preclude an output to said establishing means if said caller records no message on said answering unit.

10. The telephone signaling system of claim 6 wherein said system includes means for disconnecting from said establishing means within a predetermined period of time.

11. An alerting system having means for receiving a telephone message from a calling party, said message being for an intended party, means operative upon said received message for recording said message, means cooperative with said recording means for signaling the recording of said message, and a telephone at the location of said intended party for alerting said intended party, said signaling means comprising:
means responsive to the recording of a message by said recording means for providing an output indicative thereof,
an outgoing telephone line,
means cooperative with said line for outpulsing the digits of a preselected telephone number over said line, said preselected number being the identity of said telephone,
means responsive to the time duration of said message for enabling said outpulsing means only when said time duration exceeds a preselected value,
means responsive to a busy signal indication from said called telephone appearing on said line for repeatedly activating said outpulsing means after each correspondingly repetitive reappearance of a busy signal on said line until said answer signal appears on said line, and
means cooperative with said activating means for deactivating said activating means after a predetermined time interval has elapsed.

12. A telephone alerting system, comprising:
a telephone link;
an electronic answering unit having recording means whereby a telephone caller can record a message for later playback;
means operative with said answering unit for sensing recording of a message on said answering unit and for providing a signal indicative thereof;
means for automatically dialing a preselected telephone number over said telephone link upon receipt of said signal from said sensing means; and
a generator for providing an audio tone over said telephone link to the called telephone identified by said dialed number whereby an intended recipient can quickly be alerted to the presence of a message recorded on said answering unit.

13. The telephone alerting system of claim 12 wherein said generator provides a preselected coded signal, and wherein a plurality of said systems can be connected with said called telephone and can be distinguished therebetween by said preselected coded signals.

14. The telephone alerting system of claim 12 wherein said system further comprises means responsive to a signal over said link for extending said recorded message over said link.

15. A telephone signaling system for use with an electronic answering unit that is connectable with a telephone so that when connected a caller can record a message for later playback by an intended recipient, said system comprising:
a voice detector operative upon sensing a message recorded on said answering unit for providing an output signal indicative thereof;
a trigger circuit operative upon receipt of said output signal for generating a trigger pulse;
a tone generator for providing a predetermined tone signal;
a trigger switch responsive to said trigger pulse enabling said tone generator;
a clock operative with said generator for disabling said tone generator after a predetermined time interval;
means responsive to said trigger pulse for dialing a preselected telephone number;
selection means cooperative with said dialing means for selecting said preselected number; and
means for connecting said tone generator with the called telephone identified by said preselected number so that said tone signal is coupled to said called telephone upon dialing of said number.

16. The telephone signaling system of claim 15 wherein said system further comprises means for automatic redialing said called telephone if a busy signal is encountered when said preselected number is dialed.

17. The telephone signaling system of claim 15 wherein said system further comprises a plurality of comparators and selector switches for selecting said preselected number.

18. The telephone signaling system of claim 15 wherein said system further comprises a staircase generator and an interdigit delay generator.

19. The telephone signaling system of claim 16 wherein said dialing means further comprises means for repeatedly dialing said preselected telephone number until the continuous redialing circuit is disarmed.

20. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
means responsive to the recording of said message by said recording means for providing an output indicative thereof, and
means receptive of said output for activating said alerting means.

21. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
means responsive to the recording of said message by said recording means for providing an output indicative thereof,
means receptive of said output for activating said alerting means, and means for extending to said alerting means a unique coded signal, said coded signal corresponding to the identity of said recording means.

22. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof,
   means receptive of said output for activating said alerting means, and
   means for preselecting said coded signal from a plurality of coded signals.

23. The alerting system of claim 20 in which said activating means further comprises means for establishing a path to said alerting means, said establishing means being deactivated when said alerting means responds with an answer signal.

24. The alerting system of claim 23 in which said establishing means comprises means for repeatedly accessing said alerting means until said alerting means responds with said answer signal.

25. The alerting system of claim 24 in which said accessing means further comprises means for controlling the time between said repeated accessions.

26. The alerting system of claim 24 in which said establishing means further comprises means for inhibiting said accessing means after a predetermined time period has elapsed.

27. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof, said providing means comprises means responsive to the time duration of said message for enabling said activating means only when said time duration exceeds a preselected value, and
   means receptive of said output for activating said alerting means.

28. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof,
   means receptive of said output for activating said alerting means, and
   means responsive to a signal from said intended party after being alerted of said message for disarming said activating means.

29. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof,
   means receptive of said output for activating said alerting means, and
   means operative with said output for delaying the enabling of said activating means.

30. An alerting system having means for receiving a telephone message from a calling party, means operative upon said message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof,
   means receptive of said output for establishing a path to said alerting means,
   means cooperative with said establishing means for extending to said alerting means over said path a unique coded signal, said coded signal corresponding to the identity of said recording means, and
   means responsive to a signal from said intended party after being alerted with said coded signal for disarming said establishing means.

31. The alerting system of claim 30 in which said extending means comprises means for preselecting said coded signal from a plurality of coded signals.

32. A system for extending a telephone message from a calling party to an intended party having a plurality of message alerting units wherein each message alerting unit includes means for receiving said message from said calling party, means operative upon said received message for recording said message, means cooperative with said recording means for signaling the recording of said message, and means at the location of the intended party receptive of said signal for alerting said intended party, said signaling means comprising:
   means responsive to the recording of said message by said recording means for providing an output indicative thereof,
   means receptive of said output for activating said alerting means, and
   means responsive to the activation of said alerting means for extending to said alerting means a unique coded signal, said signal identifying said unit to said intended party.

33. The alerting system of claim 32 in which said extending means comprises means for preselecting said coded signal from a plurality of coded signals.

34. The alerting system of claim 32 in which said activating means further comprises means for establishing a path from said system to said alerting means.

35. The alerting system of claim 34 in which said establishing means comprises means for repeatedly accessing said alerting means until said alerting means responds with said answer signal, said answer signal signifying the establishment of said path.

36. The alerting system of claim 35 in which said accessing means further comprises means for controlling the time interval between said repeated accessing.

37. The alerting system of claim 35 in which said establishing means further comprises means for inhibiting said accessing means after a predetermined time interval has elapsed.

38. The alerting system of claim 35 further comprising means responsive to a signal from said intended party after being alerted for disarming said establishing means.

39. The alerting system of claim 32 in which said providing means comprises means responsive to the time duration of said message for enabling said activating means only when said time duration exceeds a preselected value.

40. An alerting system having means for receiving a message from a calling party, means operative upon said received message for recording said message, means cooperative with said recording means for signaling the recording of said message, and means at the location of the intended party receptive of said signal for alerting said intended party, said signaling means comprising:
   means responsive to the recording of a message by said recording means for providing an output indicative thereof,
   means operative upon receipt of said output for repeatedly accessing said alerting means until said alerting means responds with an answer signal, and
   means operative upon the elapse of a preselected time interval for inhibiting said accessing means from repeatedly accessing said alerting means.

41. The alerting system of claim 40 in which said signaling means further comprises means cooperative with said accessing means for controlling the time between said repeated accessing.

42. The alerting system of claim 40 in which said signaling means further comprises means cooperative with said output for delaying delivery of said output to said accessing means.

43. The alerting system of claim 42 in which said providing means comprises means responsive to the time duration of said message for enabling said accessing means only when said time duration exceeds a preselected value.

44. The alerting system of claim 42 in which said alerting means is a called telephone and in which said accessing means comprises:
   an outgoing telephone line,
   means cooperative with said telephone line for outpulsing the digits of a preselected telephone number over said line, said preselected number being the identity of said called telephone, and
   means responsive to a busy signal indication from said called telephone appearing on said line for repeatedly outpulsing said digits over said line after each correspondingly repetitive reappearance of a dial signal on said line until said answer signal appears on said line.

45. The alerting system of claim 44 in which said inhibiting means further comprises means cooperative with each appearance of said dial signal on said line for delaying said outpulsing of said digits.

46. The alerting system of claim 44 in which said inhibiting means further comprises means for deactivating said outpulsing means after a predetermined time interval has elapsed.

47. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of a message by said recording means for providing an output indicative thereof,
   means operative upon receipt of said output for repeatedly accessing said alerting means until said alerting means responds with an answer signal, said answer signal inhibiting said accessing means,
   means cooperative with said output for delaying delivery of said output to said accessing means, and
   means cooperative with said accessing means for delaying the time between each of said repeated accessing attempts.

48. The alerting system of claim 47 in which said activating means comprises means responsive to said answer signal for extending to said alerting means a unique coded signal, said coded signal corresponding to the identity of said recording means.

49. The alerting system of claim 47 in which said signaling means further comprises means responsive to a signal from said intended party after being alerted of said message for disarming said activating means.

50. The alerting system of claim 47 in which said providing means comprises means responsive to the time duration of said message for enabling said accessing means after a predetermined time period has elapsed.

51. An alerting system having means for receiving a telephone message from a calling party, means operative upon said received message for recording said message, means cooperative with said recording means for signaling the recording of said message, and means at the location of the intended party receptive of said signal for alerting said intended party, said signaling means comprising:
   means responsive to the recording of a message by said recording means for providing an output indicative thereof,
   means operative upon receipt of said output for repeatedly accessing said alerting means until said alerting means responds with an answer signal, and
   means responsive to the time duration of said message for enabling said accessing means only when said time duration exceeds a predetermined value.

52. The alerting system of claim 51 in which said alerting means is a called telephone and in which said accessing means comprises:
   means cooperative with a telephone line for automatically outpulsing the digits of a preselected telephone number over said line, said preselected number being the identity of said called telephone, and
   means responsive to a busy signal indication from said called telephone appearing on said line for repeatedly outpulsing said digits over said line after each correspondingly repetitive reappearance of a dial signal on said line until said answer signal from said called telephone appears on said line.

53. A method for alerting a person of a recorded telephone message directed to said person from a calling party in a message retention system having means for receiving the message from the calling party, means operative upon the received message for recording the message, and means at the location of said person for alerting said person of the recorded message, said method comprising the steps of:
- detecting the recording of the message by the recording means,
- accessing said alerting means at periodic intervals until said alerting means responds with an answer signal to said system,
- enabling said accessing means only when the time duration of the message exceeds a predetermined value, and
- establishing a path to the alerting means upon receipt of said answer signal.

54. A method for alerting the intended party of a recorded telephone message from a calling party to a message retention system having means for receiving the message from the calling party, means operative upon the received message for recording the message, and means at the location of the intended party for alerting the intended party of the recorded message, said method comprising the steps of:
- detecting the recording of the message by the recording means,
- establishing a path to the alerting means in response to the detection of a message, and
- extending a coded signal corresponding to the identity of the recording means to the alerting means over the established path.

55. The method of claim 54 in which the step of establishing a path further comprises the steps of:
- accessing said alerting means at periodic intervals until said alerting means responds with an answer signal thereby establishing the path, and
- inhibiting the aforesaid steps of accessing after a predetermined amount of time has elapsed.

56. The method of claim 55 in which the step of detecting the recording of the message occurs only when the message exceeds a predetermined amount of time.

57. The method of claim 54 further comprising the step of preselecting the coded signal from a plurality of available coded signals at a time in advance of the recording of the message.

58. A method for alerting a person of a recorded telephone message from a calling party to a message retention system having means for receiving the message from the calling party, means operative upon the received message for recording the message, and means at the location of said person for alerting said person of the recorded message, said method comprising the steps of:
- detecting the recording of the complete message by the recording means,
- accessing the alerting means at periodic delayed intervals in response to the detection until the alerting means responds with an answer signal,
- establishing a path from the system to the alerting means in response to the answer signal, and
- inhibiting said accessing means from accessing the alerting means after a predetermined amount of time has elapsed.

59. The method of claim 58 further comprising the step of extending a coded signal corresponding to the identity of the recording means to the alerting means in response to the establishment of the path.

60. The method of claim 59 further comprising the step of preselecting the coded signal from a plurality of available coded signals at a time in advance of the recording of the message.

61. The method of claim 58 further comprising the step of enabling said accessing means only when the time duration of the message exceeds a predetermined value.

62. A method for alerting a person of a recorded telephone message directed to said person from a calling party in a message retention system having means for receiving the message from the calling party, means operative upon the received message for recording the message, a telephone at the location of said person for alerting said person of the recording message, and an interconnecting telephone line, said method comprising the steps of:
- detecting the recording of a message by the recording means,
- enabling the aforesaid step of detecting only when the message exceeds a predetermined time interval,
- outpulsing digits of a preselected telephone number over said line in response to said enabling, said preselected number being the identity of said telephone,
- repeating said outpulsing of said digits over said line until said telephone responds with an answer signal,
- stopping the aforesaid step of repeating when a further predetermined time interval has elapsed, and
- establishing a path from the system to the alerting means in response to the answer signal.

* * * * *